United States Patent [19]

Shimamura

[11] Patent Number: 5,790,194
[45] Date of Patent: Aug. 4, 1998

[54] TELEVISION CAMERA PROMPTER SYSTEM

[75] Inventor: Takashi Shimamura, Omiya, Japan

[73] Assignee: Fuji Photo Optical Co., Ltd., Omiya, Japan

[21] Appl. No.: 607,440

[22] Filed: Feb. 27, 1996

Related U.S. Application Data

[63] Continuation of Ser. No. 319,592, Oct. 7, 1994, abandoned.

[30] Foreign Application Priority Data

Oct. 18, 1993 [JP] Japan ................................. 5-259678
Sep. 28, 1994 [JP] Japan ................................. 6-232831

[51] Int. Cl.⁶ ........................................... H04N 5/225
[52] U.S. Cl. ................................. 348/375; 348/722
[58] Field of Search ........................ 348/61, 74, 375, 348/722; 345/149, 147, 124; 361/681, 682; 248/919, 920, 921, 922, 923

[56] References Cited

U.S. PATENT DOCUMENTS

| | | | |
|---|---|---|---|
| 4,708,312 | 11/1987 | Rohr | 248/281.11 |
| 4,849,746 | 7/1989 | Dubner | 345/124 |
| 4,894,722 | 1/1990 | Suzuki | 348/722 |
| 5,082,235 | 1/1992 | Crowther et al. | 248/278 |
| 5,245,328 | 9/1993 | Garrett | 345/149 |
| 5,386,227 | 1/1995 | Zeper | 348/61 |

FOREIGN PATENT DOCUMENTS 306933  6/1989  Japan .................... H04N 5/222

*Primary Examiner*—Wendy Garber
*Assistant Examiner*—Andrew B. Christensen
*Attorney, Agent, or Firm*—Oliff & Berridge PLC

[57] ABSTRACT

An indicator provided thereon with a crystal panel is detachably secured to a grip portion of a main body of an Electronic News Gathering camera through a support arm, and the crystal panel is positioned around an Electronic News Gathering lens. With this arrangement, a news caster can give a news comment and the like while directly watching a picture image of a broadcasting script, which is displayed by the crystal panel. In this prompter, a half mirror can be dispensed with, so that the prompter can be rendered lighter in weight and easily portable.

15 Claims, 6 Drawing Sheets

TELEVISION CAMERA PROMPTER SYSTEM

This is a Continuation of application Ser. No. 08/319,592 filed Oct. 7, 1994, now abandoned.

BACKGROUND OF THE INVENTION

1. Field of the Invention

This invention relates to a television camera prompter system, and more particularly to a television camera prompter system used for television broadcasting stations, news gathering and the like.

2. Description of the Related Art

In many television broadcasting stations, prompters have been used for projecting and indicating a news script in front of a taking lens of a television camera for a news caster. In Japanese Patent Application (laid-open) No. 147970/1989, the present applicant has proposed a prompter, in which a transmitting type crystal display means is used in place of a conventional cathode-ray tube display means, thereby improving the controllability of the pan- or tilt-operation and the like.

As shown in FIG. 6, the television camera prompter system of this type consists of a transmitting type crystal display plate (hereinafter referred to as a "crystal panel") 1 and a half mirror 2, a picture image of a material 4 such as a news script taken by a video camera 3 is indicated on the aforesaid crystal panel 1 connected to the video camera, and the picture image of the script 4 for broadcasting, which is indicated on the crystal panel 1, is reflected by the aforesaid half mirror 2 toward the news caster 5. The aforesaid crystal panel 1 and half mirror are fixed to a support base 7 extended forwardly from a television camera 6 and disposed in front of a taking lens 8 of the television camera 6.

With this arrangement, the news caster 5 can give a news comment and the like toward the television camera 5, while watching the picture image of the script 4 for broadcasting.

However, the conventional television camera prompter system has such disadvantages in that the provision of a half mirror 2 adds more weight to the prompter, so that it is difficult to make the television camera prompter system portable, thus not allowing the use of the prompter for the gathering of news and the like.

SUMMARY OF THE INVENTION

The present invention has been developed to eliminate the above-described disadvantages and has as one object the provision of a television camera prompter system which is convenient and portable.

To achieve the above-described object, the present invention is characterized in that a television camera prompter system comprises:

- a main body of a television camera, to which is secured a taking lens;
- a display means for displaying a picture image of a script for broadcasting; and
- a support arm holding the display means in a manner to dispose the display means in the vicinity of the taking lens and secured to any one of the three parts including the main body of the television camera, the taking lens and a support member for supporting the main body of the television.

According to the present invention, the support arm for holding the display means is secured to any one of the three parts including the main body of the television, the taking lens and the support member for supporting the main body of the television camera, the display means is disposed in the vicinity of the taking lens and the news comment and the like are given while the picture image of the script for broadcasting is being directly watched.

With this arrangement, according to the present invention, the half mirror is dispensed with, whereby the prompter is rendered light in weight, so that the prompter can easily be portable.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DESCRIPTION OF THE PREFERRED EMBODIMENT

Detailed description will hereunder be given of the preferred embodiment of the television camera prompter system according to the present invention with reference to the accompanying drawings.

Figure 1:
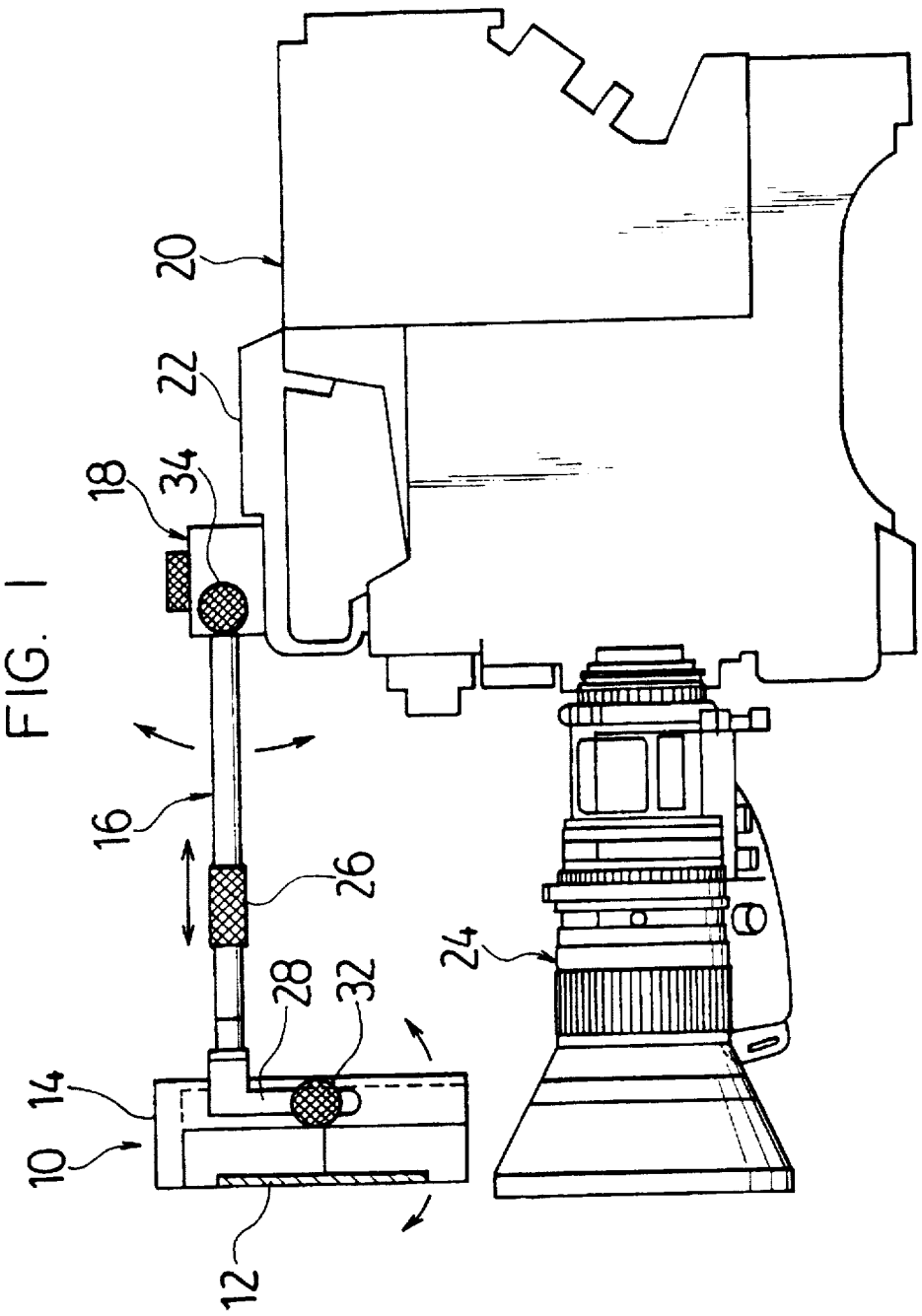
FIG. 1 is a view showing a first embodiment of the television camera prompter system according to the present invention.
Figure 2:
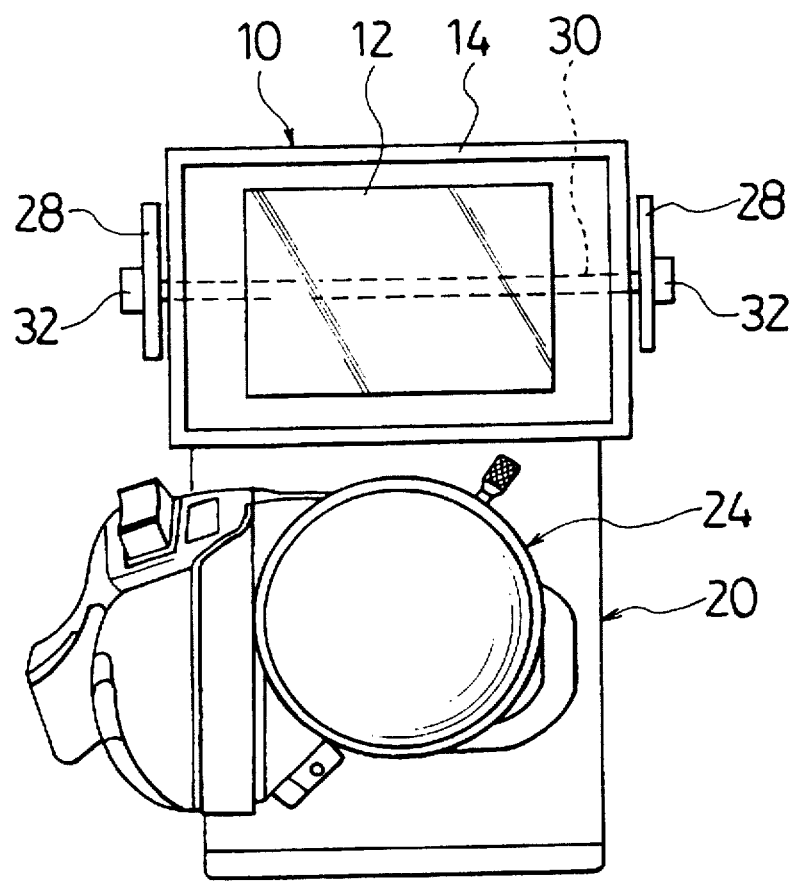
FIG. 2 is a left side view of FIG. 1.

FIG. 1 is a side view showing a portable television camera, i.e., an ENG (Electronic News Gathering) camera which can be carried on a shoulder, to which is applied the television camera prompter system according to the present invention, and FIG. 2 is a front view of FIG. 1.

The aforesaid prompter 10 is mainly constituted by an indicator 14 provided with a crystal panel 12. This indicator 14 is detachably secured to a grip portion 22 of a main body 20 of the ENG camera through a support arm 16, and a top and bottom angle adjusting portion 18, and the aforesaid crystal panel 12 is positioned around an ENG lens 24 as being a taking lens. Connected to the aforesaid crystal panel 12 through a cable, not shown, is a video camera, and there is shown a picture image of a broadcasting script which is photographed by this video camera.

The aforesaid support arm 16 can be adjusted in its length by turning a screw 26 secured to the substantially central portion thereof. Furthermore, the aforesaid indicator 14 is journally supported by a bifurcatedly formed forward end portion 28 of the support arm 16 through a shaft 30 indicated by a dotted line in FIG. 2, and is inclined to a desirable angle and fixed thereto by tightening screws 32 and 32, which are provided at opposite ends of this shaft 30. The aforesaid top and bottom angle adjusting portion 18 has the mechanism capable of changing a top and a bottom angles of the support arm 16.

According to the television camera prompter system with this arrangement, when the crystal panel 12 is set as being directed to the news caster, the news caster can give the news comment and the like toward the ENG camera, while directly watching the picture image of the script indicated by the crystal panel 12. With this arrangement, in the television camera prompter system shown in this embodiment, the half mirror is eliminated to render the prompter light in weight, so that the television camera prompter system can be easily portable.

Furthermore, when this television camera prompter system is applied to the ENG camera, camera personnel can maneuver easily, allowing this television camera prompter system to be used for news gathering and the like that occurs outdoors.

Further, in the past, the taking lens that can be used has been limited due to the size of the half mirror. However, in this embodiment, the half mirror is dispensed with, so that the taking lens can be selected freely and also a wide angle lens can be used.

Furthermore, in this embodiment, if the picture image of the script is previously memorized in a memory portion of the ENG lens 24 and this picture image is indicated on the crystal panel 12, then the video camera for photographing the script can be dispensed with. In this case, the operation of turning over the aforesaid picture images of the script can be performed by the news caster or a reporter.

Incidentally, in this embodiment, the crystal panel 12 has been disposed upwardly of the ENG lens, however, the present invention should not necessarily be limited to this, because any position around the outside of the ENG lens 24 can be adopted.

Figure 3:
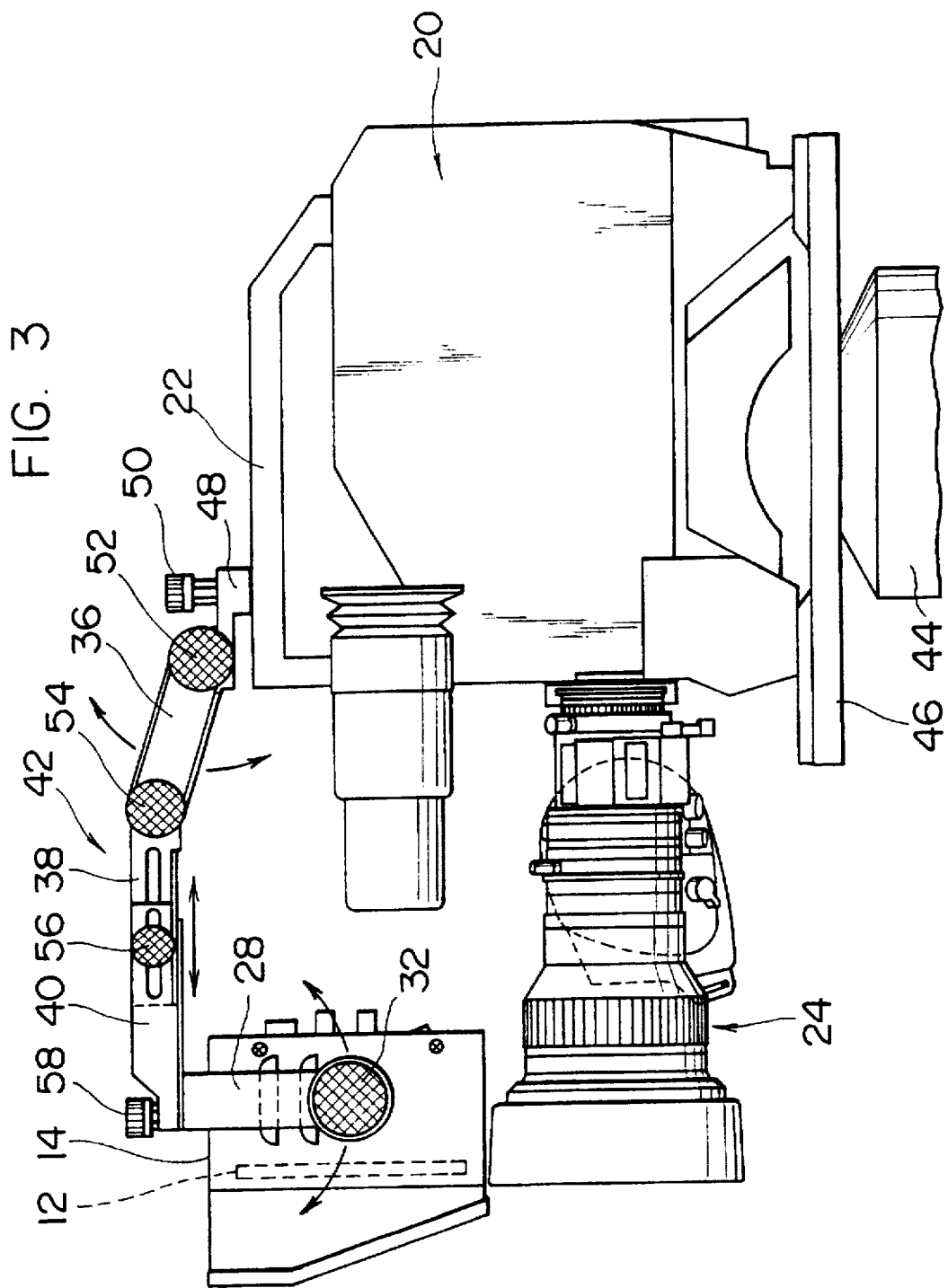
FIG. 3 is a view showing a second embodiment of the television camera prompter system according to the present invention.

FIG. 3 is a side view showing the embodiment of the television camera prompter system, in which the prompter is secured to the main body of the television camera, and same reference numerals are used to designate same or similar parts corresponding to ones as shown in the embodiment shown in FIGS. 1 and 2, so that the detailed description may be omitted.

An indicator 14 of the prompter as shown in FIG. 3 is secured to a main body 20 of a television camera through a support arm 42 constituted by three arms 36, 38 and 40. The main body 20 of this television camera is fixed onto a plate 46 of a universal head 44.

The proximal end portion of an arm 36 of the support arm 42 is secured to a fixed block 48, and this fixed block 48 is fixed to a grip portion 22 of the main body 20 of the television camera by a fixing screw 50. Furthermore, the arm 36 is connected to the fixed block 48 by an adjusting knob 52 as being an angle adjusting means, and an angle of the arm 36 in the vertical direction relative to the fixed block 48 is adjusted by this adjusting knob 52.

The arm 38 is connected to the arm 36 by an adjusting knob 54 that is one type of an angle adjusting means, and an angle of the arm 38 in the vertical direction relative to the arm 36 is adjusted by the adjusting knob 54. Furthermore, the arm 40 is connected to the arm 38 through an adjusting knob 56 that is one type of an arm length adjusting means, and the length of the arm 40 relative to the arm 38 is adjusted by this adjusting knob 56. Furthermore, the indicator 14 is fixed to the support arm 42 through the bifurcated forward end portion 28 by a screw 58 similarly to the embodiment shown in FIGS. 1 and 2.

Accordingly, according to the television camera prompter system having the above-described arrangement, the angle in the vertical direction and the length of the support arm 42 are adjusted by the adjusting knobs 52, 54 and 56, so that the indicator 14 can be positioned at a desirable position.

Figure 4:
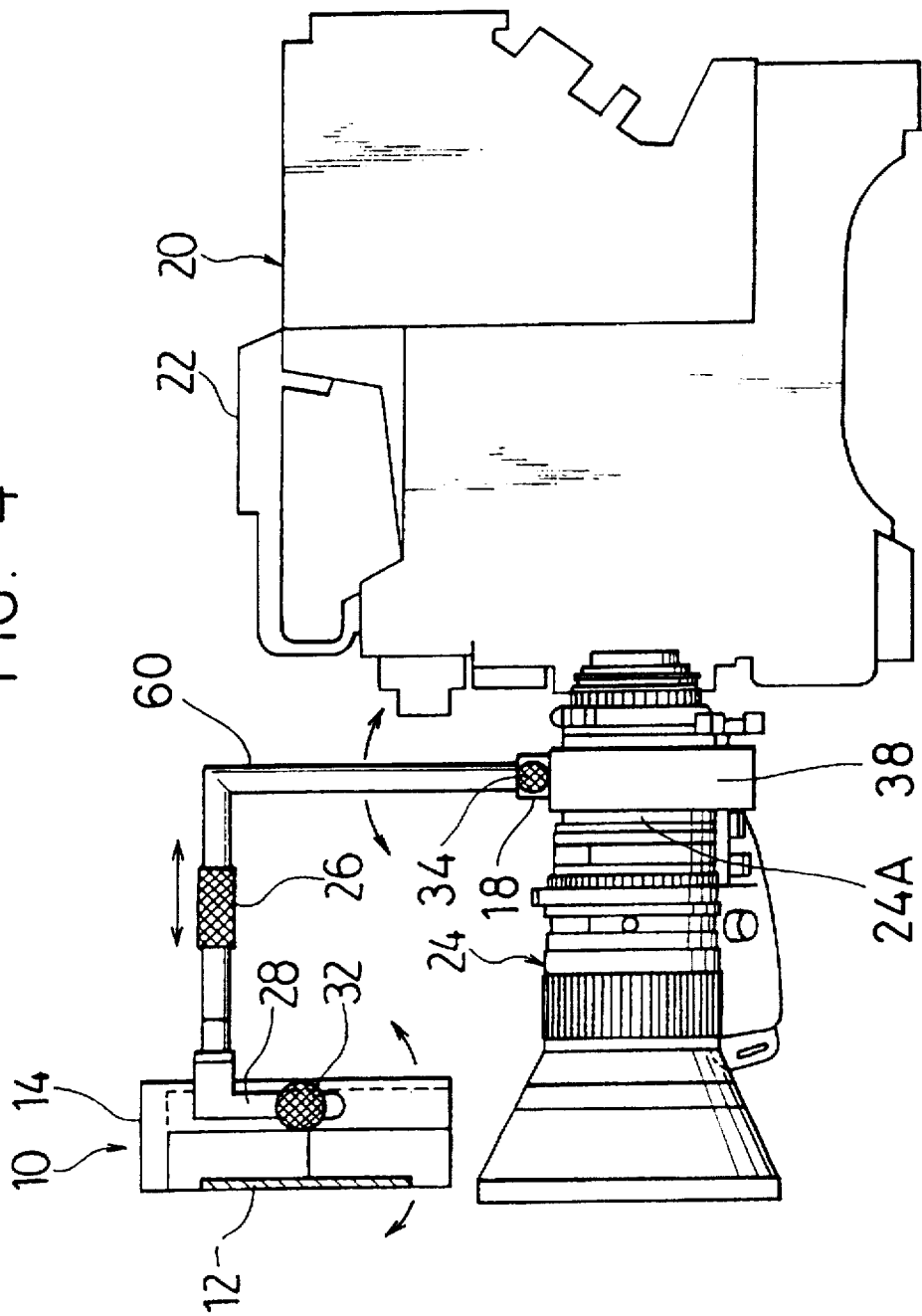
FIG. 4 is a view showing an embodiment of the television camera prompter system, in which the prompter is provided on the main body of the taking lens.

FIG. 4 is the side view showing the embodiment of the television camera prompter system, in which the prompter is secured to the side of the ENG lens 24, and same reference numerals are used to designate same or similar parts corresponding to ones as shown in the embodiment shown in FIGS. 1 and 2, so that the detailed description may be omitted.

The indicator 14 of the prompter 10 shown in FIG. 4 is provided on a holder 38 through an inverted L-shaped support arm 60 and the top and bottom angle adjusting portion 18, and this holder 38 is secured to a proximal outer peripheral portion 24A of a main body of the ENG lens 24, whereby the crystal panel 12 is positioned around the ENG lens 24. The aforesaid support arm 60 can be adjusted in its length in the direction of a taking optical axis of the ENG lens 24 by turning a screw 26.

Figure 5:
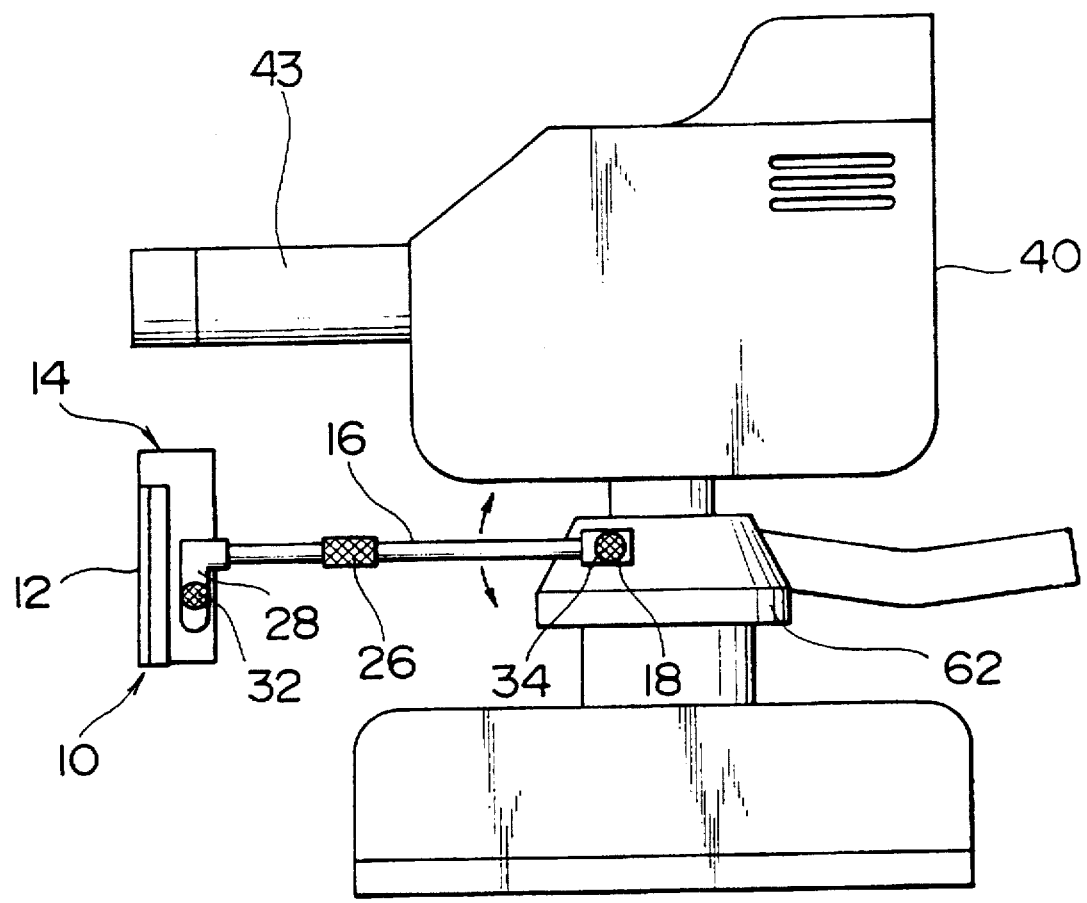
FIG. 5 is a view showing an embodiment of the television camera prompter system, in which the prompter is provided on a universal head.
Figure 6:
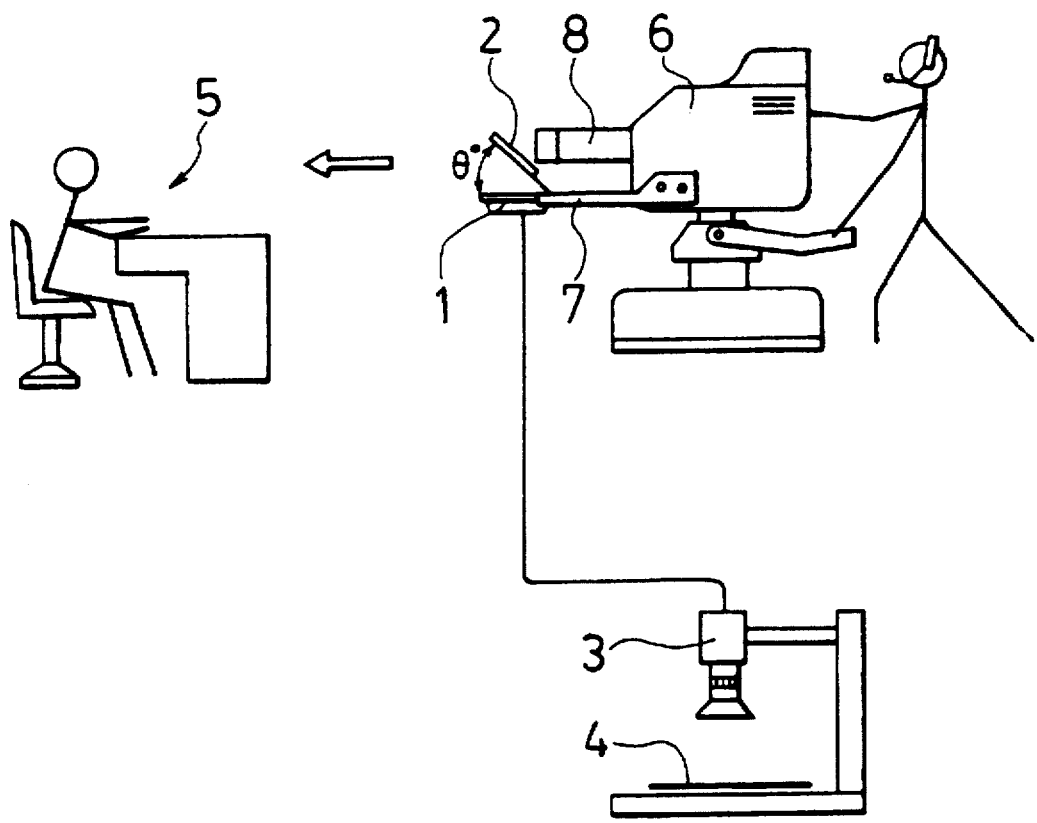
FIG. 6 is an explanatory view showing an embodiment of the conventional prompter.

FIG. 5 is the side view showing the embodiment of the television camera prompter system, in which the prompter is secured to the universal head for supporting the television camera, and same reference numerals are used to designate same or similar parts corresponding to ones as shown in the embodiments shown in FIGS. 1 and 2, so that the detailed description may be omitted.

The prompter 10 shown in FIG. 5 is detachably secured to a universal head 62 for supporting a television camera 40 through the support arm 16 and the top and bottom angle adjusting portion 18, and the crystal panel 12 is positioned around a taking lens 43.

As described above, in the television camera prompter system according to the present invention, the indicator 14 may be positioned in the vicinity of the lens of the camera, and for this purpose, the indicator 14 may be supported by any one of the three including the main body of the television camera, the taking lens and the support members for supporting the television camera such as the universal head, the plate which is secured onto the universal head, the tripod and the like.

In this embodiment, the crystal panel 12 has been used as the indicator, however, the present invention should not necessarily be limited to this, and a plasma display may be used in place of the crystal panel 12. The use of the plasma display can render the indicator smaller than the cathode-ray tube display means as in the case of the crystal panel 12.

Furthermore, in this embodiment, if the support arm is firmly constructed, then the cathode-ray tube may be used as the indicator.

As has been described hereinabove, according to the television camera prompter system of the present invention, the support arm for supporting the display means is secured to any one of three elements including the main body of the television camera, the taking lens and the support member for supporting the television camera, the display means is positioned in the vicinity of the taking lens, and the news comment and the like are given while the picture image of the script for broadcasting, which is displayed by the display means is directly watched, whereby the half mirror is dispensed with, so that the prompter can be easily portable.

It should be understood, however, that there is no intention to limit the invention to the specific forms disclosed, but on the contrary, the invention is to cover all modifications, alternate constructions and equivalents falling within the spirit and scope of the invention as expressed in the appended claims.

I claim:

1. A television camera prompter system for a portable television camera to prompt a broadcaster, comprising:

a main body of the television camera;

a taking lens secured to said main body;

memory means for storing a picture image of a script for broadcasting;

a crystal display plate for displaying the picture image of the script for broadcasting, said crystal display plate being connected to said memory means and disposed adjacent the taking lens, said crystal display plate projecting a picture image of the script toward the broadcaster;

a housing for said crystal display plate;

a support arm that holds said housing adjacent said taking lens, said support arm comprising at least a first angle adjusting mechanism, a second angle adjusting mechanism and a linearly extendible arm member between the first angle adjusting mechanism and the second angle adjusting mechanism, said support arm being further secured at one end to one of said main body of said television camera and said taking lens and at an opposite end to said housing, the linearly extendible arm member having a first plane passing through a longitudinal axis thereof, the first angle adjusting mechanism having an axis of rotation transverse to the first plane, the second angle adjusting mechanism having an axis of rotation transverse to the first plane, and a second plane parallel to the crystal display plate, the second plane transverse to the first plane and the support arm is linearly extendible only in the first plane.

2. The television camera prompter system as set forth in claim 1, further comprising arm length adjusting means for linearly adjusting a length of said linearly extendible arm to adjust a position of said crystal display plate and said first angle adjusting mechanism and said second angle adjusting mechanism allow positioning of the crystal display plate with respect to the taking lens and orienting a viewing surface of the crystal display plate with respect to a sight path between eyes of the broadcaster and said taking lens.

3. The television camera prompter system as set forth in claim 1, wherein said housing is connected to said support arm through the second angle adjusting mechanism to enable changing an angle of said crystal display plate relative to the sight path.

4. The television camera prompter system as set forth in claim 1, wherein the picture image of the script for broadcasting displayed by said crystal display means is stored in said memory plate.

5. The television camera prompter system as set forth in claim 1, wherein said first angle adjusting mechanism secures said support arm to the one of said main body of said television camera and said taking lens, said second angle adjusting mechanism connects said housing and said support arm.

6. The television camera prompter system as set forth in claim 1, wherein said television camera may be mounted to a support member and said support arm secured to said support member in lieu of the one of said main body of said television camera and said taking lens.

7. A television camera prompter system for a portable television camera, comprising:

a main body of the television camera;

a taking lens mounted to said main body;

a memory device that stores a picture image of a script for broadcasting;

a liquid crystal display that displays the picture image of the script for broadcasting, said liquid crystal display connected to said memory device and disposed adjacent said taking lens, said liquid crystal display projecting the picture image of the script toward a broadcaster;

a housing mounting said liquid crystal display;

an adjustable support arm that holds said housing to position said liquid crystal display adjacent said taking lens, said support art being secured to one of the main body of said television camera and said taking lens; and means for adjusting said adjustable support arm to change an angle of said liquid crystal display relative to a line of sight between eyes of the broadcaster and said taking lens and a distance to the eyes of the broadcaster, wherein said means for adjusting comprises a first angle adjusting mechanism; a second angle adjusting mechanism, said first angle adjusting mechanism adjusting the angle of said liquid crystal display relative to the line of sight and said second angle adjusting mechanism adjusting a separation of said liquid crystal display from said taking lens; and length adjusting means for linearly adjusting a length of said adjustable support arm, said length adjusting means is positioned between said first angle adjusting mechanism and said second angle adjusting mechanism and having a first plane passing through a longitudinal axis thereof, the first angle adjusting mechanism having an axis of rotation transverse to the first plane, the second angle adjusting mechanism having an axis of rotation transverse to the first plane, and a second plane parallel to the crystal display plate, the second plane transverse to the first plane and the support arm is linearly extendible only in the first plane.

8. The television camera prompter system as set forth in claim 7, wherein the picture image of the script for broadcasting displayed by said liquid crystal display is stored in said memory device.

9. The television camera prompter system as set forth in claim 7, wherein said second angle adjusting mechanism secures said adjustable support arm to the one of said main body of said television camera and said taking lens, said first angle adjusting mechanism connects said housing and said support arm and said length adjusting means is positioned between said first angle adjusting mechanism and said second angle adjusting mechanism.

10. The television camera prompter system as set forth in claim 7, wherein said television camera may be mounted to a support member and said adjustable support arm secured to said support member in lieu of the one of said main body of said television camera and said taking lens.

11. A method of prompting a broadcaster using a television camera prompter system, the television camera prompter system including a main body of a portable television camera, a taking lens adjustably mounted to the main body, a memory device, a housing containing a liquid crystal display device, and a support arm connecting the housing to one of the main body and the taking lens, the method comprising:

positioning the liquid crystal display device adjacent the taking lens with the support arm using a first angle adjusting mechanism;

securing the support arm to one of the main body of the portable television camera and the taking lens;

adjusting the liquid crystal display device relative to a sight line between a broadcaster and the taking lens using a second angle adjusting mechanism and a linear adjusting mechanism;

storing a picture image of a script in the memory device;

reading the picture image of the script from the memory device; and displaying the picture image of the script on the liquid crystal display device, the linear adjusting mechanism of the support arm having a first plane passing through a longitudinal axis thereof, the first angle adjusting mechanism having an axis of rotation transverse to the first plane, the second angle adjusting mechanism having an axis of rotation transverse to the first plane, and a second plane parallel to the crystal display plate, the second plane transverse to the first plane and the support arm is linearly extendible only in the first plane during the adjusting step.

12. A prompter system for use with a portable camera having a main body and a lens system, comprising:

a liquid crystal display;

a housing holding the liquid crystal display;

a support arm adjustably mounted via a first angle adjusting mechanism at one end to the housing and adjustably mounted via a second angle adjusting mechanism at an opposite end to one of the camera main body and the camera lens system and having a linearly extendible arm segment positioned between the first angle adjusting mechanism and the second angle adjusting mechanism; and means for placing an image of a script on the liquid crystal display, wherein the support arm allows the liquid crystal display plate mounted in the housing to be positioned just off a sight line between a broadcaster and an input lens of the lens system, the linearly extendible arm segment having a first plane passing through a longitudinal axis thereof, the first angle adjusting mechanism having an axis of rotation transverse to the first plane, the second angle adjusting mechanism having an axis of rotation transverse to the first plane, and a second plane parallel to the crystal display plate, the second plane transverse to the first plane and the support arm is linearly extendible only in the first plane.

13. The prompter system as set forth in claim 12, wherein the adjustable mounting at least one of the first angle adjusting mechanism and the second angle adjusting mechanism allows an angle of the liquid crystal display plate to be adjusted relative to the sight line.

14. The prompter system as set forth in claim 13, wherein the support arm further comprises a third angle adjusting mechanism and a fixed arm segment, the fixed arm segment between the third angle adjusting mechanism and the second angle adjusting mechanism.

15. The prompter system as set forth in claim 12, wherein the camera may be mounted to a support member and the support arm adjustably mounted at the opposite end to the support member in lieu of to the one of the camera main body and the camera lens system.

\* \* \* \* \*